United States Patent
Hajika et al.

(10) Patent No.: US 10,647,355 B2
(45) Date of Patent: May 12, 2020

(54) LANE DEVIATION PREVENTION CONTROL DEVICE FOR VEHICLE

(71) Applicant: SUBARU CORPORATION, Tokyo (JP)

(72) Inventors: Ryo Hajika, Tokyo (JP); Masahito Takizawa, Tokyo (JP); Yuki Aoyama, Tokyo (JP); Daisuke Mashiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 97 days.

(21) Appl. No.: 16/152,997

(22) Filed: Oct. 5, 2018

(65) Prior Publication Data
US 2019/0152523 A1 May 23, 2019

(30) Foreign Application Priority Data
Nov. 17, 2017 (JP) ................................ 2017-221583

(51) Int. Cl.
*B62D 6/00* (2006.01)
*B62D 15/02* (2006.01)
(Continued)

(52) U.S. Cl.
CPC ........... *B62D 15/025* (2013.01); *B60W 30/00* (2013.01); *B62D 6/005* (2013.01); *B62D 6/02* (2013.01); *B60Y 2300/12* (2013.01)

(58) Field of Classification Search
None
See application file for complete search history.

(56) References Cited

U.S. PATENT DOCUMENTS 2,877,967 A * 3/1959 Markusen ............ G05D 1/0202
244/185
4,031,527 A * 6/1977 Yanagishima ......... B60K 28/06
340/576
(Continued)

FOREIGN PATENT DOCUMENTS

JP 63168508 A * 7/1988
JP 2005096710 A * 4/2005
(Continued)

OTHER PUBLICATIONS

Japanese Notice of Reasons for Refusal issued in corresponding Japanese Patent Application No. 2017-221583, dated Oct. 1, 2019, with English translation.

*Primary Examiner* — Shelley Chen
(74) *Attorney, Agent, or Firm* — McDermott Will & Emery LLP

(57) ABSTRACT

A lane deviation prevention control device for a vehicle includes an exterior information detector and a lane deviation prevention control start determiner. The lane deviation prevention control start determiner determines to start a lane deviation prevention control even when an own vehicle has already deviated from an own lane on which the own vehicle is traveling, on the condition that the exterior information detector detects an approaching vehicle that is approaching the own vehicle, on an adjacent lane on deviation side on which deviation is taking place, and that a lateral position of the own vehicle is equal to or smaller than a control start threshold.

18 Claims, 6 Drawing Sheets

(51) Int. Cl.
*B62D 6/02* (2006.01)
*B60W 30/00* (2006.01)

(56) References Cited

U.S. PATENT DOCUMENTS

| | | | | |
|---|---|---|---|---|
| 6,496,759 | B1* | 12/2002 | Mattes | B60R 21/013 180/282 |
| 6,577,948 | B1* | 6/2003 | Skellenger | G01C 21/26 303/140 |
| 7,996,131 | B2* | 8/2011 | Yamashita | G01B 21/22 280/735 |
| 2002/0042671 | A1* | 4/2002 | Chen | B60K 28/16 701/41 |
| 2003/0023359 | A1* | 1/2003 | Kueblbeck | B60R 21/013 701/45 |
| 2004/0183663 | A1* | 9/2004 | Shimakage | G06K 9/00798 340/436 |
| 2005/0096828 | A1* | 5/2005 | Uemura | B60T 8/17557 701/70 |
| 2006/0155454 | A1* | 7/2006 | Herrmann | B60T 8/17555 701/70 |
| 2009/0088926 | A1* | 4/2009 | Yamashita | G01B 21/22 701/41 |
| 2011/0238252 | A1* | 9/2011 | Takeda | B60W 40/072 701/31.4 |
| 2012/0212353 | A1* | 8/2012 | Fung | B60W 30/08 340/905 |
| 2013/0063595 | A1* | 3/2013 | Niem | B62D 15/025 348/148 |
| 2015/0246687 | A1* | 9/2015 | Takeda | B62D 6/002 701/41 |
| 2015/0274206 | A1* | 10/2015 | Takeda | B62D 6/008 701/41 |
| 2016/0001781 | A1* | 1/2016 | Fung | G16H 50/20 701/36 |
| 2016/0280262 | A1* | 9/2016 | Oyama | B62D 15/025 |
| 2017/0043772 | A1* | 2/2017 | Watanabe | B60W 30/12 |
| 2017/0113546 | A1* | 4/2017 | Maeda | B60K 23/04 |
| 2018/0057054 | A1* | 3/2018 | Tokoro | G08G 1/167 |
| 2018/0202804 | A1* | 7/2018 | Dumble | G01B 21/24 |

FOREIGN PATENT DOCUMENTS

| | | |
|---|---|---|
| JP | 2010-030386 A | 2/2010 |
| JP | 2010-125652 A | 6/2010 |
| JP | 2014-085805 A | 5/2014 |
| JP | 2016-064799 A | 4/2016 |
| JP | 2017189989 A * | 10/2017 |

* cited by examiner

LANE DEVIATION PREVENTION CONTROL DEVICE FOR VEHICLE

CROSS-REFERENCE TO RELATED APPLICATIONS

The present application claims priority from Japanese Patent Application No. 2017-221583 filed on Nov. 17, 2017, the entire contents of which are hereby incorporated by reference.

BACKGROUND

The technology relates to a lane deviation prevention control device for a vehicle that executes a lane deviation prevention control including preventing the vehicle from deviating from its traveling lane.

Regarding vehicles, e.g., automobiles, there has been known a technique of providing a vehicle with a steering device such as an electronic power steering (EPS) device, and performing a steering assistance control such as a lane keeping control and a lane deviation prevention control, on the basis of exterior environment around the vehicle. The EPS device is able to control a steering angle through an electronic motor, independently of a steering input by a driver. The lane keeping control includes keeping a traveling position of an own vehicle inside a lane. The lane deviation prevention control includes preventing the own vehicle from deviating from its traveling lane. The exterior environment may be recognized by, for example, a camera or radar equipment. For example, reference can be made to Japanese Unexamined Patent Application Publication (JP-A) No. 2016-64799.

SUMMARY

An aspect of the technology provides a lane deviation prevention control device for a vehicle. The lane deviation prevention control device includes an exterior information detector and a lane deviation prevention control start determiner. The exterior information detector is configured to detect an approaching vehicle that is traveling on an adjacent lane and approaching an own vehicle. The adjacent lane is in adjacency to an own lane on which the own vehicle is traveling. The lane deviation prevention control start determiner is configured to determine whether or not to start a lane deviation prevention control, on the basis of a relative-to-lane yaw angle of the own vehicle relative to the own lane, and on the basis of a lateral position of the own vehicle relative to the own lane. The lane deviation prevention control includes preventing the own vehicle from deviating from the own lane. The lane deviation prevention control start determiner is configured to determine to start the lane deviation prevention control even when the own vehicle has already deviated from the own lane, on the condition that the exterior information detector detects the approaching vehicle on the adjacent lane on deviation side on which deviation is taking place, and that the lateral position of the own vehicle is equal to or smaller than a control start threshold.

An aspect of the technology provides a lane deviation prevention control device for a vehicle. The lane deviation prevention control device includes an exterior information detector and circuitry. The exterior information detector is configured to detect an approaching vehicle that is traveling on an adjacent lane and approaching an own vehicle. The adjacent lane is in adjacency to an own lane on which the own vehicle is traveling. The circuitry is configured to determine whether or not to start a lane deviation prevention control, on the basis of a relative-to-lane yaw angle of the own vehicle relative to the own lane, and on the basis of a lateral position of the own vehicle relative to the own lane. The lane deviation prevention control includes preventing the own vehicle from deviating from the own lane. The circuitry is configured to determine to start the lane deviation prevention control even when the own vehicle has already deviated from the own lane, on the condition that the exterior information detector detects the approaching vehicle on the adjacent lane on deviation side on which deviation is taking place, and that the lateral position of the own vehicle is equal to or smaller than a control start threshold.

DETAILED DESCRIPTION

In the following, some implementations of the technology are described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same numerals to avoid redundant description.

Interference by a generally-adopted lane deviation prevention control sometimes causes a hindrance to a driver's driving operation, in a case where the driver tends to make their vehicle travel offset toward a side edge of a lane, or in a case where the driver is trying to overtake a preceding vehicle. To address such situations, a possible measure may be to suppress the lane deviation prevention control, in a case with the driver's steering operation in a direction of deviation, to permit movement to an adjacent lane.

The generally-adopted lane deviation prevention control is, however, basically intended for prevention of outward deviation from an own lane on which an own vehicle is traveling. Once the own vehicle has deviated from the own lane, the generally-adopted lane deviation prevention control has no way to start the lane deviation prevention control, even if there are any vehicles approaching the own vehicle, on an adjacent lane on deviation side on which deviation is taking place. This causes concern about enhancement in safety.

It is desirable to provide a lane deviation prevention control device for a vehicle that makes it possible to determine, even when an own vehicle has already deviated from a lane, whether or not to start a lane deviation prevention control in accordance with presence or absence of an approaching vehicle on an adjacent lane on deviation side on which deviation is taking place, leading to an enhanced level of safety.

Figure 1:
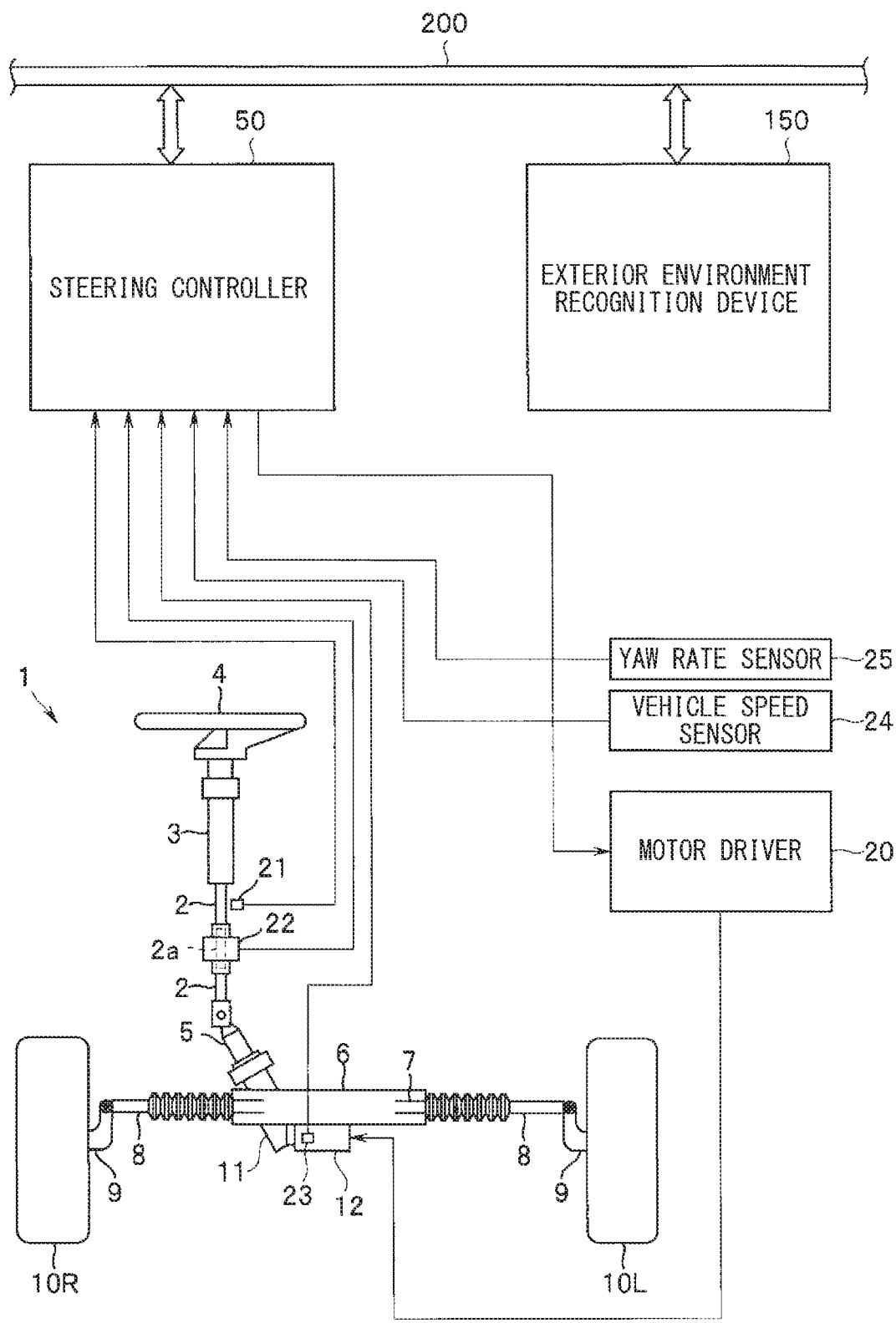
FIG. 1 is a diagram illustrating an example of a configuration of a vehicle steering system.

FIG. 1 illustrates an electronic power steering (EPS) device 1. The EPS device 1 may serve as a steering device that is able to control a steering angle through an actuator, independently of a steering input by a driver. In the EPS device 1, a steering shaft 2 may be rotatably supported, through a steering column 3, by an undepicted chassis of a vehicle, e.g., an automobile.

One end of the steering shaft 2 may be extended toward a driver's seat, while another end of the steering shaft 2 may be extended toward an engine room. A steering wheel 4 may be fixed to the end of the steering shaft 2 on side on which the driver's seat is disposed. A steering angle sensor 21 may be disposed on outer circumferential side of the steering shaft 2 to which the steering wheel 4 is coupled.

The steering angle sensor 21 may include, for example, two pairs of magnetoresistive elements, in its inside. The magnetoresistive elements may detect rotation of a magnet incorporated in a sensing gear. The steering angle sensor 21 may set in advance a reference rotation position of the steering wheel 4. The reference rotation position may be, for example, a rotation position of an upper part of the steering wheel 4 in a straight traveling state of the vehicle. Thus, the steering angle sensor 21 may be able to detect, on the basis of a variation in magnetism caused by rotation of the sensing gear, a rotation angle, i.e., a steering angle, and a rotation direction, i.e., a steering direction, from the fixed reference position set in advance.

A torsion bar 2a may be disposed in the middle of the steering shaft 2. A pinion shaft 5 may be coupled to the end of the steering shaft 2 extended toward the engine room. A torque sensor 22 may be disposed on outer circumferential side of the torsion bar 2a. The torque sensor 22 may detect dislocation caused by torsion of the torsion bar 2a. The dislocation is generated circumferentially around the steering shaft 2, between side on which the steering wheel 4 is disposed and side on which the pinion shaft 5 is disposed. Thus, the torque sensor 22 may be able to detect steering torque produced by steering by the driver.

A steering gear box 6 may be disposed inside the engine room. The steering gear box 6 may extend in a vehicle widthwise direction. A rack shaft 7 may be reciprocatably inserted in and supported by the steering gear box 6. The rack shaft 7 may include undepicted racks. The racks may be engaged with pinions formed on the pinion shaft 5, to form a rack-and-pinion steering mechanism.

Right and left ends of the rack shaft 7 may be protruded from respective ends of the steering gear box 6. To the protruded ends of the rack shaft 7, coupled may be front knuckles 9, through tie rods 8. The front knuckles 9 may rotatably support right and left wheels 10R and 10L as steering wheels. The front knuckles 9 may be steerably supported by the chassis. Operating the steering wheel 4 causes rotation of the steering shaft 2 and the pinion shaft 5. The rotation of the pinion shaft 5 causes rightward or leftward movement of the rack shaft 7. The movement causes the front knuckles 9 to rotate around an undepicted king pin shaft as a center, causing the right and left wheels 10R and 10L to be steered rightward or leftward.

An electric power steering (EPS) motor 12 may be coupled to the pinion shaft 5 through an assistant transmission mechanism 11. The EPS motor 12 may serve as an actuator that allows for assistance with the driver's steering operation and automatic steering. The assistant transmission mechanism 11 may include a reduction gear mechanism such as worm gears. The EPS motor 12 may be, for example, an electric motor constituted by a direct current (DC) brushless motor including a stator and a rotor. The stator may be fixed to a case. The rotor may rotate inside the stator. The rotation of the rotor of the electric motor is converted, through the assistant transmission mechanism 11, into axial movement of the rack shaft 7.

A rotation angle sensor 23 may be incorporated in the EPS motor 12. The rotation angle sensor 23 may detect a rotation angle of the rotor. The rotation angle sensor 23 may be, for example, a sensor that detects a relative rotation angle of the rotor to a predetermined zero point position by, for example, a rotary encoder. A signal from the rotation angle sensor 23 may be supplied to the steering controller 50.

It is to be noted that in the rotation angle sensor 23, initial setting of the zero point position may be provided, for example, when an ignition switch is turned to an 'ON' position. The initial setting may be based on the steering angle detected by the steering angle sensor 21 and based on a reduction ratio of the assistant transmission mechanism 11. Normally, the rotation angle detected by the rotation angle sensor 23 and the rotation angle of the steering wheel 4 detected by the steering angle sensor 21 may be dealt as the same steering angle.

The steering controller 50 may be a control unit that includes a microcomputer as its main component. The microcomputer may include, for example, a central processing unit (CPU), a read only memory (ROM) that stores, for example, programs, and a random access memory (RAM) that serves as a work area. The steering controller 50 may perform a drive control of the EPS motor 12 through the motor driver 20. The steering controller 50 may be supplied with signals from sensors and undepicted switches. Non-limiting examples of the sensors may include the steering angle sensor 21, the torque sensor 22, the rotation angle sensor 23, and other sensors including a vehicle speed sensor 24 and a yaw rate sensor 25. The vehicle speed sensor 24 may detect a vehicle speed. The yaw rate sensor 25 may detect a yaw rate, i.e., a rotation speed of the vehicle around a vertical axis.

The steering controller 50 may be coupled to a communication bus 200 that forms an in-vehicle network. To the communication bus 200, coupled may be an exterior environment recognition device 150 that recognizes exterior environment of the vehicle, to acquire travel environment information. Other undepicted controllers may be also coupled to the communication bus 200. Non-limiting examples may include an engine controller, a transmission controller, and a brake controller. The controllers are able to transmit and receive control information to and from one another through the communication bus 200.

The exterior environment recognition device 150 may recognize the exterior environment around the own vehicle on the basis of, for example, detection information of objects around the own vehicle, traffic information, positioning information of a position of the own vehicle, and high definition map information. The detection information may be acquired by various devices such as a camera and millimeter wave radar for forward recognition, and a side camera and sideward radar for sideward recognition. The traffic information may be acquired by infrastructure communication such as road-vehicle communication and inter-vehicle communication. The positioning information may be based on signals from, for example, global positioning satellites (GPS). The high definition map information may include road shape data and data for a travel control. Non-limiting examples of the road shape data may include a curvature, a lane width, and a road shoulder width of a road. Non-limiting examples of the data for the travel control may include a road azimuth angle, categories of lane lines, and the number of lanes.

In one implementation, the exterior environment recognition device 150 may serve as an "exterior information detector" that detects, as exterior information regarding an own vehicle, lane information regarding an own lane on which the own vehicle is traveling, and lane information regarding an adjacent lane in adjacency to the own lane. The exterior information includes presence of a surrounding vehicle that is traveling on the adjacent lane. The exterior environment recognition device 150 may mainly perform recognition of forward environment of the own vehicle, and recognition of rear-sideward environment of the own vehicle. The recognition of the forward environment may be made by an on-vehicle camera and an image recognition unit. The recognition of the rear-sideward environment may be made by rear-sideward radar. Recognition processing of the forward environment may include recognizing, mainly, the traveling lane of the own vehicle, the adjacent lane, preceding vehicles, and oncoming vehicles. Recognition processing of the rear-sideward environment may include recognizing, mainly, surrounding vehicles on the adjacent lane rearward of the own vehicle.

The camera for the forward recognition is assumed to be a stereo camera including two cameras that capture images of an identical object from different points of view. It is to be noted that the two cameras that constitute the stereo camera may be a shutter synchronous camera including imaging elements such as charge coupled device (CCD) and complementary metal oxide semiconductor (CMOS). The two cameras may be disposed, for example, in the vicinity of a rearview mirror inside a front windshield in an upper part of a vehicle cabin, with a predetermined baseline length.

Processing on image data from the stereo camera may be carried out, for example, as follows. First, a distance image may be generated, on the basis of an amount of dislocation between corresponding positions, in a pair of stereo images in the traveling direction of the own vehicle captured by the stereo camera. The distance image may have distance information. With the use of the distance information of the distance image, recognition of lane lines and recognition processing of three-dimensional objects may be carried out. Non-limiting examples of the lane lines may include white lane lines and other kinds of lane lines. Non-limiting examples of the three-dimensional objects may include preceding vehicles and oncoming vehicles.

In the recognition of the lane lines such as the white lane lines, changes in luminance of a road in a widthwise direction may be evaluated on the basis of knowledge that the lane lines are higher in luminance than a road surface. Thus, positions of right and left lane lines on an image plane may be identified on the image plane. A position (x, y, z) of the lane line in actual space may be calculated by a known coordinate conversion expression, on the basis of the distance information, i.e., on the basis of a position (i, j) on the image plane and parallax calculated regarding the relevant position (i, j).

A coordinate system in the actual space may be set, with reference to the position of the own vehicle. In this implementation, as illustrated in, for example, FIG. 3, the coordinate system in the actual space may have the road surface directly below the camera as an origin, a vehicle widthwise direction as an x axis, a vehicle heightwise direction as a y axis, and a vehicle lengthwise direction, i.e., a direction of distance, as a z axis. At this occasion, an x-z plane (y=0) may coincide with the road surface, in a case where the road is flat. A road model may be represented, by dividing the traveling lane of the own vehicle on the road into a plurality of sections, approximating right and left lane lines in each section as predetermined, and coupling the approximated right and left lane lines to one another.

For the approximation processing of the right and left lane lines, adopted may be, for example, approximation processing of the lane lines by a least square method. In one specific but non-limiting example, the lane line on left side of the own vehicle may be approximated by the least square method, as given by the following expression (1). The lane line on right side of the own vehicle may be approximated by the least square method, as given by the following expression (2).

$$x = AL \cdot z^2 + BL \cdot z + CL \quad (1)$$

$$x = AR \cdot z^2 + BR \cdot z + CR \quad (2)$$

In the expressions (1) and (2) given above, "AL" and "AR" denote curvatures of respective curves. A curvature κL of the lane line on the left side may be 2·AL. A curvature κR of the lane line on the right side may be 2·AR. Thus, a lane curvature κ may be represented by the following expression (3).

$$\kappa = (2 \cdot AL + 2AR)/2 = AL + AR \quad (3)$$

Figure 3:
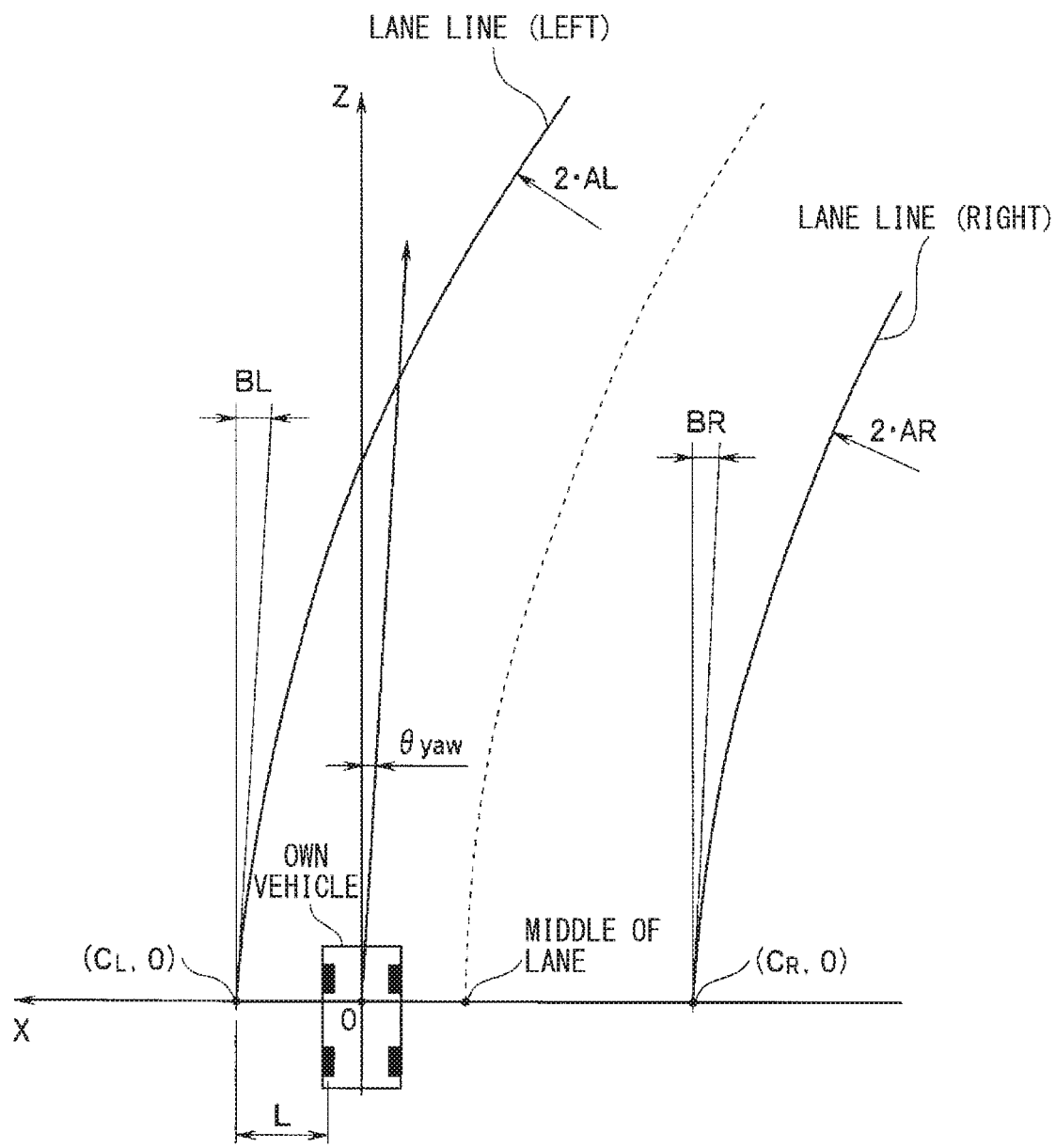
FIG. 3 is a diagram describing an own vehicle and a lane, together with various parameters.

In the expressions (1) and (2), "BL" and "BR" denote inclinations of the respective curves in the widthwise direction of the own vehicle. "CL" and "CR" denote positions of the respective curves in the widthwise direction of the own vehicle. Refer to FIG. 3.

The exterior environment recognition device 150 may further calculate a relative-to-lane yaw angle θyaw of the own vehicle, by the following expression (4).

$$\theta yaw = \tan^{-1}((BL + BR)/2) \quad (4)$$

The recognition of the rear-sideward environment by the exterior environment recognition device 150 may include, for example, detecting a surrounding vehicle on the adjacent lane, by the rear-sideward radar provided right and left corners of a rear bumper of the own vehicle. Thereafter, a determination may be made, on the basis of a relative speed of the surrounding vehicle to the own vehicle, as to what kind of vehicle the surrounding vehicle is, for example, a parallel-traveling vehicle or an overtaking vehicle. The parallel-traveling vehicle means a vehicle that is traveling, on the adjacent lane, side by side with the own vehicle. The overtaking vehicle means a vehicle that approaches the own vehicle from behind on the adjacent lane, in order to pass the own vehicle.

A recognition result of the exterior environment by the exterior environment recognition device 150 may be transmitted to the steering controller 50 and other controllers. The steering controller 50 may perform a driver assistance control that includes automatic driving of the own vehicle and assisting the driver with driving. In the driver assistance control, the steering controller 50 may set a target course to be traveled by the own vehicle, from the recognition result of the exterior environment. The steering controller 50 may execute a steering assistance control, through the motor driver 20 that drives the EPS motor 12, to allow the own vehicle to travel to follow the target course. In a case with detection of steering interference by an operation of the steering wheel by the driver, the steering controller 50 may allow the EPS motor 12 to output assistive torque that assists the driver with a steering operation.

The target course in a steering control by the steering controller 50 may be set on the basis of the recognition result of the exterior environment by the exterior environment recognition device 150. For example, in a lane keeping control that includes allowing the own vehicle to follow a lane and keeping the own vehicle in the middle of the lane, the middle position between the right and left lane lines in a road widthwise direction may be set as the target course. The steering controller 50 may set a target steering angle that allows a middle position of the own vehicle in the vehicle widthwise direction to coincide with the target course. The steering controller 50 may control a drive current of the EPS motor 12, to allow the steering angle of the steering control to coincide with the target steering angle. It is to be noted that the target course may be set by other controllers than the steering controller 50, e.g., the exterior environment recognition device 150.

The steering controller 50 may execute not only the lane keeping control but also a lane deviation prevention control. The lane keeping control may include keeping the own vehicle in the middle of the lane. The lane deviation prevention control may include preventing the own vehicle from deviating from the lane. The lane deviation prevention control may be executed in a case where a determination has been made that keeping current behavior of the own vehicle would possibly result in lane deviation. In addition, in a case where the own vehicle has partly deviated from the own lane without executing the lane deviation prevention control, for example, in order to overtake a preceding vehicle, a determination may be made as to whether or not to return the own vehicle to the previously-traveled lane in view of surrounding conditions and traveling states. In a case where a determination is made for a return, the lane deviation prevention control may be started.

Figure 2:
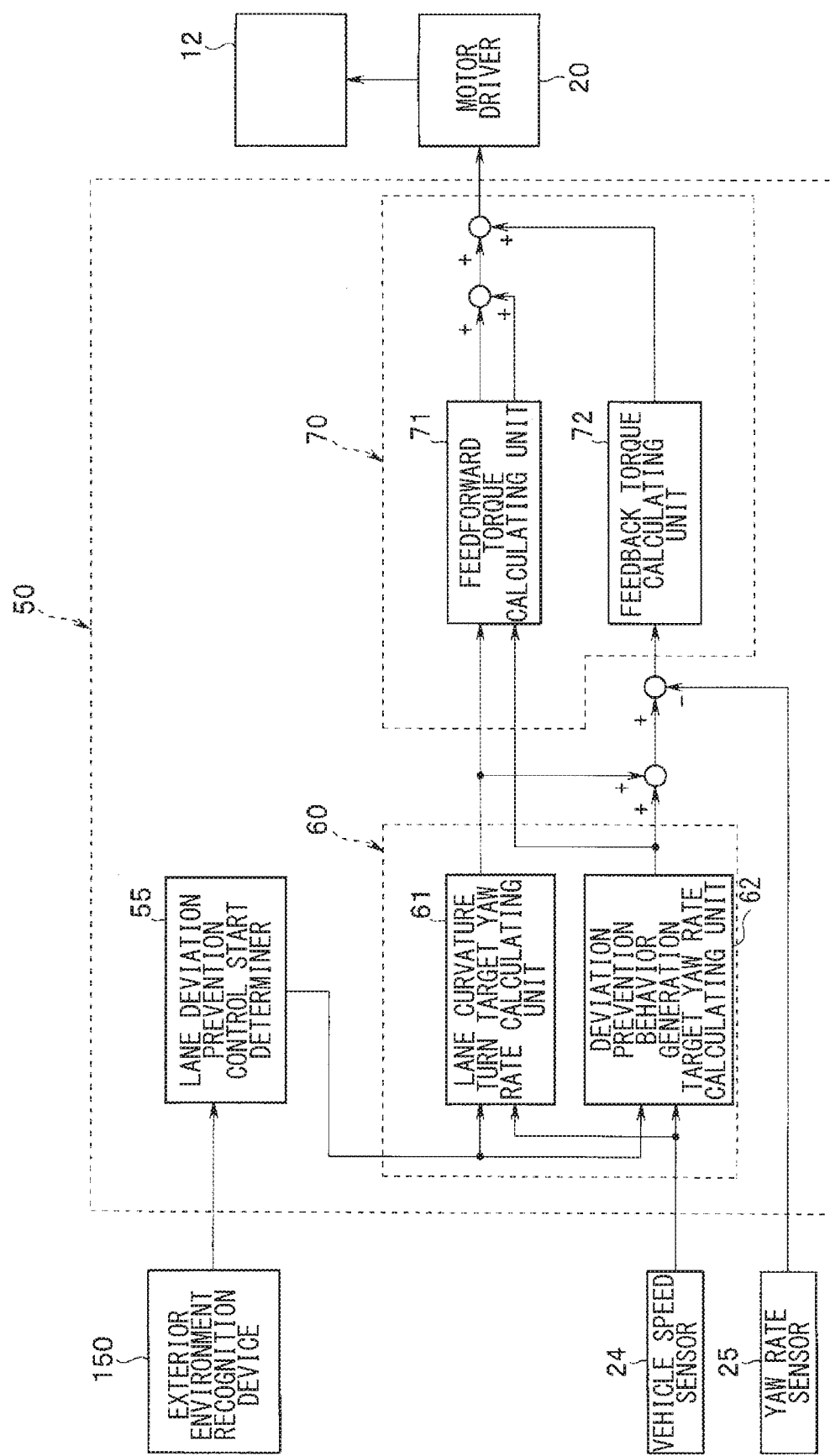
FIG. 2 is a block diagram illustrating an example of functions of a steering control system.

Thus, as illustrated in FIG. 2, the steering controller 50 may include, as its main configuration, a lane deviation prevention control start determiner 55, a target yaw rate calculator 60, and a target steering torque calculator 70. The lane deviation prevention control start determiner 55 may determine whether or not to start the lane deviation prevention control. The target yaw rate calculator 60 may calculate a target yaw rate that allows the own vehicle to travel along the target course. The target steering torque calculator 70 may calculate target steering torque that serves as instruction torque for the EPS motor 12 in order to attain the target yaw rate. The lane deviation prevention control start determiner 55, the target yaw rate calculator 60, and the target steering torque calculator 70 may serve as functional units related to the lane deviation prevention control.

In a case where the relative-to-lane yaw angle of the own vehicle is directed to the direction of deviation, on the basis of information from the exterior environment recognition device 150 and on the basis of the traveling states of the own vehicle, the lane deviation prevention control start determiner 55 may check the following conditions (a) to (d), to determine whether or not to start the lane deviation prevention control.

(a) Estimated Time it Takes for Own Vehicle to Deviate from Lane

Calculation of lane deviation estimated time Ttlc may be made on an assumption that the own vehicle is inside the own lane. The lane deviation estimated time Ttlc refers to time it takes for the own vehicle to stride over the lane line on the deviation side. In a case where the lane deviation estimated time Ttlc is equal to or smaller than a threshold Tth, a determination may be made that the lane deviation prevention control is to be started. The threshold Tth may be decided by the vehicle speed V of the own vehicle and the lane curvature κ. The lane deviation estimated time Ttlc may be obtained by dividing a distance L (refer to FIG. 3) from the own vehicle to the lane line on the deviation side by a speed component of the vehicle speed V of the own vehicle corresponding to the relative-to-lane yaw angle θyaw, as represented by the following expression (5).

$$Ttlc = L/(V \cdot \sin \theta yaw) \quad (5)$$

It is to be noted that the expression (5) applies to a case where the own vehicle stays inside the lane without deviating from the lane (L≥0), as described above. In a case where the own vehicle has deviated from the lane (L<0), the lane deviation estimated time Ttlc becomes zero (0), as represented by the following expression (5').

$$Ttlc = 0 \quad (5')$$

(b) Inside-Lane Position of Own Vehicle

On the assumption that the own vehicle is inside the own lane, a check may be made as to whether or not a lateral position of the own vehicle is smaller than a control start threshold W1. The control start threshold W1 may be defined inwardly of the own lane, in accordance with a lane width. It is to be noted that in this implementation, description is given on an assumption that the lateral position of the own vehicle is a distance from a side part of a vehicle body of the own vehicle on the deviation side to the lane line on the deviation side. Refer to the distance L in FIG. 3. However, the lateral position of the own vehicle may be a distance from a middle position of the own vehicle to the lane line on the deviation side.

Figure 4A:
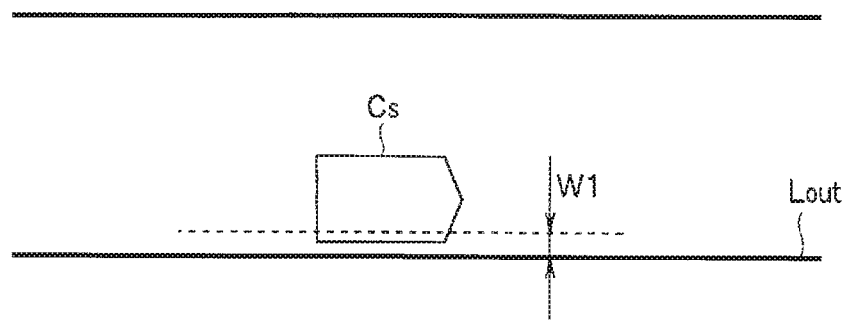
FIGS. 4A to 4C are diagrams describing whether to start a lane deviation prevention control, in accordance with a lateral position of the own vehicle.

For example, as illustrated in FIG. 4A, in a case where a lateral position of an own vehicle Cs relative to a lane line Lout is smaller than the control start threshold W1, the lane line deviation prevention control may be started. This is because the own vehicle is too close to an edge of the lane, causing possibility that the own vehicle comes into contact with an obstruction, e.g., a surrounding vehicle on the adjacent lane and a three-dimensional object on side on which a road shoulder is disposed. In this case, when the stereo camera or the rear-sideward radar has confirmed absence of an obstruction in the direction of deviation that possibly comes into contact with the own vehicle, the lane deviation prevention control may not be started, in order not to hinder the driver's intentional steering, e.g., a lane change.

(c) Presence or Absence of Overtaking Vehicle on Adjacent Lane on Deviation Side In the case where the lane deviation prevention control is not started, in order not to hinder the driver's intentional steering, a check may be made as to presence or absence of an overtaking vehicle on the adjacent lane on the deviation side. The overtaking vehicle means a vehicle that approaches from rear sideward of the own vehicle. In a case with the presence of the overtaking vehicle on the adjacent lane on the deviation side, with a predetermined control start condition being satisfied, the lane deviation prevention control may be started even after the lane deviation has already taken place, to return the own vehicle to the lane traveled before the deviation.

The start condition of the lane deviation prevention control with respect to the overtaking vehicle may be that the lateral position of the own vehicle relative to the lane line on the deviation side falls within a range inside a control start threshold W2, i.e., that the lateral position of the own vehicle is closer to the lane line on the deviation side than the control start threshold W2 is. With this condition being satisfied, the lane deviation prevention control may be started. The control start threshold W2 may be set as, for example, a distance defined laterally from the lane line on the deviation side. The control start threshold W2 is not larger than the width of the own vehicle. In a case where the lateral position of the own vehicle falls within the range inside the control start threshold W2, a determination may be made that the own vehicle is striding over the lane line on the deviation side.

Figure 4B:
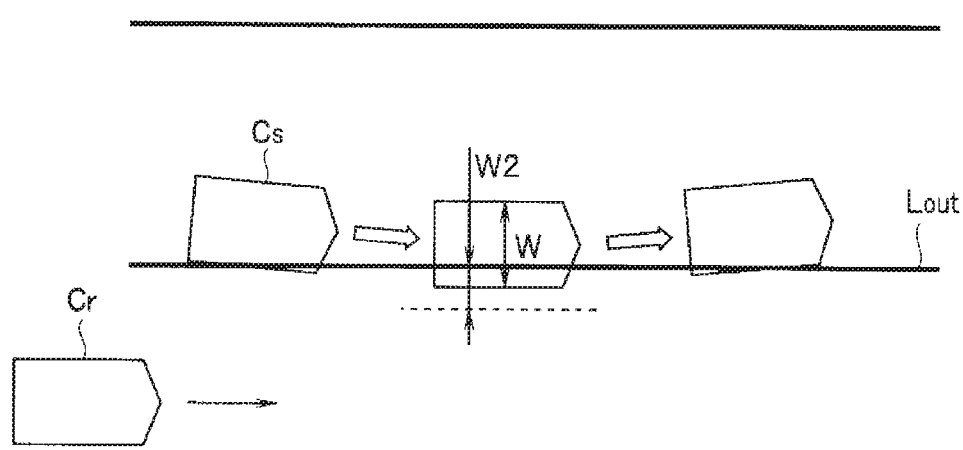

For example, as illustrated in FIG. 4B, a half width W/2 of the vehicle width W of the own vehicle Cs from the lane line Lout on the deviation side is assumed to be the control start threshold W2. Upon detection of the overtaking vehicle Cr approaching from rear sideward, with the own vehicle has not stridden over the lane line on the deviation side by more than a half of the vehicle width W, the lane deviation prevention control may be brought to operation, to return the own vehicle to inside the previously-traveled lane.

In one alternative, the control start threshold W2 may be a distance relative to the lane line on the deviation side, set in accordance with the vehicle speed of the own vehicle and in accordance with a speed of movement in the direction of deviation caused by a speed of change or a speed of turn of the lateral position toward the direction of deviation. The lane deviation prevention control may be started in a case where the movement of the own vehicle in the direction of deviation is not rapid.

(d) Presence or Absence of Oncoming Vehicle on Adjacent Lane on Deviation Side

As with the condition (c), in the case where the lane deviation prevention control is not started, in order not to hinder the driver's intentional steering, a check may be made as to presence or absence of an oncoming vehicle on the adjacent lane on the deviation side. The oncoming vehicle means a vehicle that approaches the own vehicle from forward. In a case with the presence of the oncoming vehicle on the adjacent lane on the deviation side, with a control start condition with respect to the oncoming vehicle being satisfied, the lane deviation prevention control may be started even after the lane deviation has already taken place, to return the own vehicle to the lane traveled before the deviation.

Figure 4C:
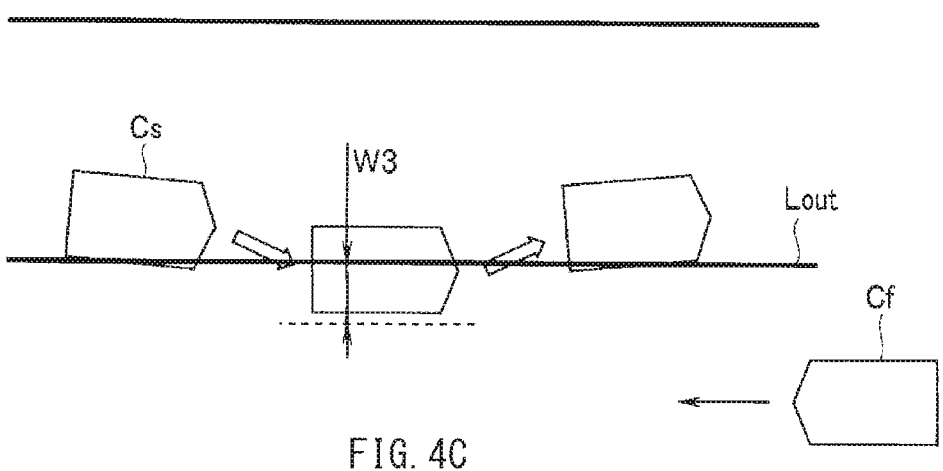

The start condition of the lane deviation prevention control with respect to the oncoming vehicle may be that the lateral position of the own vehicle relative to the lane line on the deviation side falls within a range inside a control start threshold W3, i.e., that the lateral position of the own vehicle is closer to the lane line on the deviation side than the control start threshold W3 is. With this condition being satisfied, the lane deviation prevention control may be started. For example, as illustrated in FIG. 4C, upon detection of the oncoming vehicle Cf approaching the own vehicle, with the own vehicle Cs being in the range of the control start threshold W3 from the lane line Lout on the deviation side, the lane deviation prevention control may be brought to operation, to return the own vehicle to inside the previously-traveled lane.

In this case, the control start thresholds W2 and W3 of the lane deviation prevention control may be varied in accordance with distinction between the case where the approaching vehicle is the oncoming vehicle and the case where the approaching vehicle is the overtaking vehicle. The control start threshold W3 for the oncoming vehicle may be set to cause the lane deviation prevention control to be more easily started than the control start threshold W2 for the overtaking vehicle. However, in a case where the own vehicle deviates considerably toward the adjacent lane, causing difficulty in ensuring safety by the lane deviation prevention control, an emergency brake or a collision avoidance control may be brought to operation.

As described, upon the lane deviation prevention control start determiner 55 determining that the lane deviation prevention control is to be started, the target yaw rate calculator 60 may calculate the target yaw rate. The target yaw rate may cause the own vehicle to travel along the target course. The calculation of the target yaw rate may be made on the basis of the lane curvature recognized by the exterior environment recognition device 150, the relative-to-lane yaw rate and the lateral position of the own vehicle relative to the lane, and the vehicle speed of the own vehicle detected by the vehicle speed sensor 24.

In one specific but non-limiting example, the target yaw rate calculator 60 may include a lane curvature turn target yaw rate calculating unit 61 and a deviation prevention behavior generation target yaw rate calculating unit 62. The lane curvature turn target yaw rate calculating unit 61 may calculate a lane curvature turn target yaw rate $\gamma tgt\_lane$, i.e., a yaw rate that serves as a target amount of turn in accordance with the lane curvature. The deviation prevention behavior generation target yaw rate calculating unit 62 may calculate a deviation prevention behavior generation target yaw rate $\gamma tgt\_turn$, i.e., a yaw rate that serves as a target amount of turn to prevent the deviation from the lane.

The lane curvature turn target yaw rate calculating unit 61 may calculate the lane curvature turn target yaw rate $\gamma tgt\_lane$, with the vehicle speed V of the own vehicle and the lane curvature $\kappa$, as represented by the following expression (6).

$$\gamma tgt\_lane = \kappa \cdot V \qquad (6)$$

The deviation prevention behavior generation target yaw rate calculating unit 62 may calculate a target yaw rate $\gamma tgt\_turn\_1$ for a return-to-inside-lane control (the relative-to-lane yaw angle $\theta yaw \geq 0$) and a target yaw rate $\gamma tgt\_turn\_2$ for a posture control (the relative-to-lane yaw angle $\theta yaw < 0$). The return-to-inside-lane control may be carried out at a start of the control, and include generating behavior for a return to inside the lane. The posture control may include controlling a posture with respect to the lane line on the deviation side after the return until an end of the control. The calculation of the target yaw rates $\gamma tgt\_turn\_1$ and $\gamma tgt\_turn\_2$ may be made in accordance with the relative-to-lane yaw angle $\theta yaw$ and the lateral position of the own vehicle. The target yaw rates $\gamma tgt\_turn\_1$ and $\gamma tgt\_turn\_2$ may be switched in accordance with the relative-to-lane yaw angle and the lateral position of the own vehicle. Thus, either one of them may be outputted as the deviation prevention behavior generation target yaw rate $\gamma tgt\_turn$.

It is to be noted that as to the yaw rate and the curvature, a positive sign is assumed to represent a left turn. As to the relative-to-lane yaw angle, a positive sign is assumed to represent the direction of deviation. As to the lateral position, a positive sign is assumed to represent inside the lane.

The deviation prevention behavior generation target yaw rate γtgt_turn_1 during the return-to-inside-lane control may be calculated on the basis of the lane deviation estimated time Ttlc in a case where the own vehicle is inside the lane (the lateral position of the own vehicle x>0), and calculated at a yaw rate decided in advance in a case where the own vehicle strides over the lane line (the lateral position of the own vehicle x≤0).

In other words, the deviation prevention behavior generation target yaw rate γtgt_turn_1 during the return-to-inside-lane control, with the own vehicle being inside the lane (the relative-to-lane yaw angle θyaw≥0, and the lateral position of the own vehicle x>0), may be calculated by the following expression (7).

$$\gamma tgt\_turn\_1 = \theta yaw / Ttlc \qquad (7)$$

Moreover, the deviation prevention behavior generation target yaw rate γtgt_turn_1 during the return-to-inside-lane control, with the own vehicle striding over the lane line (the relative-to-lane yaw angle θyaw≥0, and the lateral position of the own vehicle x≤0), may be calculated as a yaw rate γtgt_turn_max decided in advance, as given by the following expression (8).

$$\gamma tgt\_turn\_1 = \gamma tgt\_turn\_max \qquad (8)$$

Meanwhile, the deviation prevention behavior generation target yaw rate γtgt_turn_2 during the posture control may be calculated by multiplying a deviation between a target relative-to-lane yaw angle θtgt_yaw at the end of the control and the relative-to-lane yaw angle θyaw during the posture control by a predetermined feedback gain Kyawfb, and dividing the resultant value by time Ttgt it takes to reach the target relative-to-lane yaw angle θtgt_yaw, as represented by the following expression (9).

$$\gamma tgt\_turn\_2 = -Kyawfb \cdot (\theta tgt - \theta yaw) / Ttgt \qquad (9)$$

A final target yaw rate γtgt based on the lane curvature turn target yaw rate γtgt_lane and the deviation prevention behavior generation target yaw rate γtgt_turn (γtgt_turn_1 or γtgt_turn_2) as described above may be calculated by adding them together, as represented by the following expression (10).

$$\gamma tgt = \gamma tgt\_lane + \gamma tgt\_turn \qquad (10)$$

The target steering torque calculator 70 may include a feedforward torque calculating unit 71 and a feedback torque calculating unit 72. The feedforward torque calculating unit 71 may calculate feedforward torque by a feedforward control. The feedback torque calculating unit 72 may calculate feedback torque by a feedback control. The target steering torque calculator 70 may output, as the instruction torque for the EPS motor 12, the target steering torque that is obtained by adding the feedforward torque and the feedback torque.

The feedforward torque calculating unit 71 may calculate feedforward torque Tp_ff_lane that generates the lane curvature turn target yaw rate γtgt_lane. The feedforward torque calculating unit 71 may also calculate feedforward torque Tp_ff_turn that generates the deviation prevention behavior generation target yaw rate γtgt_turn.

The feedforward torque Tp_ff_lane and Tp_ff_turn may be calculated with the use of a torque conversion gain Kyawr_to_trq. The torque conversion gain Kyawr_to_trq may be obtained by referring to a map of the yaw rate and the torque conversion gain. The map may be created in advance. In other words, as represented by the following expression (11), the feedforward torque Tp_ff_lane may be calculated by multiplying the lane curvature turn target yaw rate γtgt_lane by the torque conversion gain Kyawr_to_trq. As represented by the following expression (12), the feedforward torque Tp_ff_turn may be calculated by multiplying the deviation prevention behavior generation target yaw rate γtgt_turn by the torque conversion gain Kyawr_to_trq.

$$Tp\_ff\_lane = Kyawr\_to\_trq \cdot \gamma tgt\_lane \qquad (11)$$

$$Tp\_ff\_turn = Kyawr\_to\_trq \cdot \gamma tgt\_turn \qquad (12)$$

The feedback torque calculating unit 72 may calculate feedback torque Tp_fb based on a deviation between the target yaw rate γtgt and an actual yaw rate γs of the own vehicle detected by the yaw rate sensor 25. The feedback torque Tp_fb may be obtained by proportional integral differential (PID) control on the deviation (γtgt−γs) between the target yaw rate γtgt and the actual yaw rate γs, as represented by the following expression (13).

$$Tp\_fb = Kp \cdot (\gamma tgt - \gamma s) + Ki \cdot \int (\gamma tgt - \gamma s) dt + Kd \cdot d(\gamma tgt - \gamma s)/dt \qquad (13)$$

A proportional gain Kp, an integral gain Ki, and a differential gain Kd of the PID control in the expression (13) may be set in accordance with presence or absence of the driver's operation of the steering wheel. In a case without the driver's operation of the steering wheel, i.e., in a case where the torque sensor 22 does not detect the steering torque, the proportional gain Kp, the integral gain Ki, and the differential gain Kd may be set in accordance with characteristics optimally set in advance. Meanwhile, in a case where the torque sensor 22 detects the driver's steering operation in a direction in which the deviation is suppressed, the proportional gain Kp, the integral gain Ki, and the differential gain Kd may be brought to zero (0). Thus, the feedback torque Tp_fb may be brought to zero (0), as represented by the following expression (14).

$$Tp\_fb = 0 \qquad (14)$$

The feedforward torque Tp_ff lane and Tp_ff turn from the feedforward torque calculating unit 71, and the feedback torque Tp_fb from the feedback torque calculating unit 72 may be added together, as represented by the following expression (15), to calculate the target steering torque Tp. The target steering torque Tp may be outputted as the instruction torque for the EPS motor 12.

$$Tp = Tp\_ff\_lane + Tp\_ff\_turn + Tp\_fb \qquad (15)$$

Figure 5:
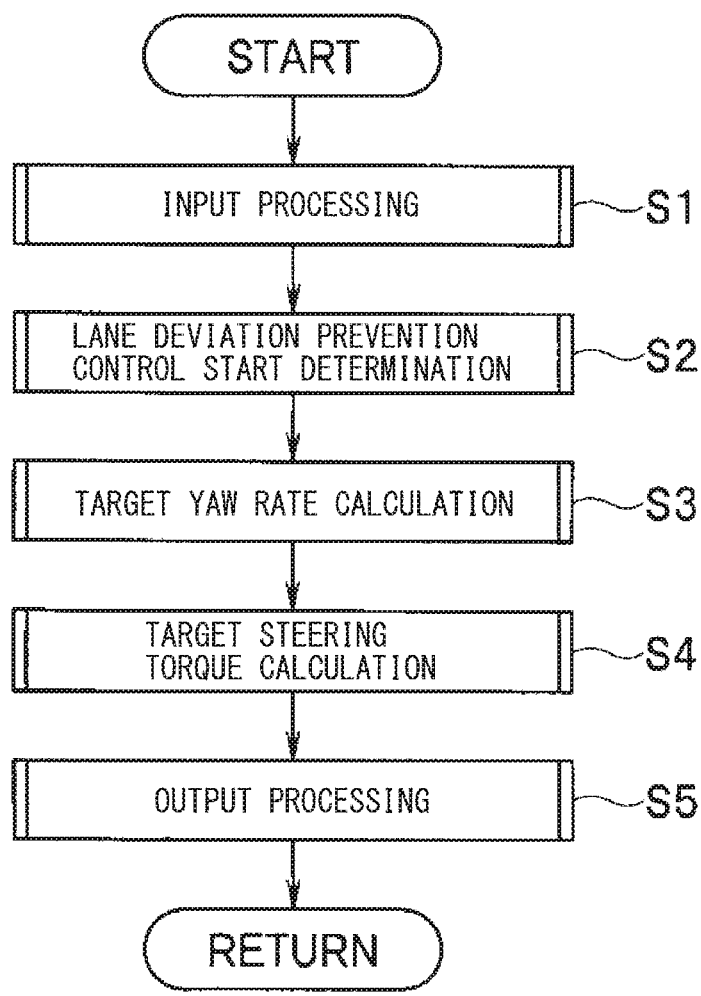
FIG. 5 is a flowchart illustrating an example of a main routine of the lane deviation prevention control.
Figure 6:
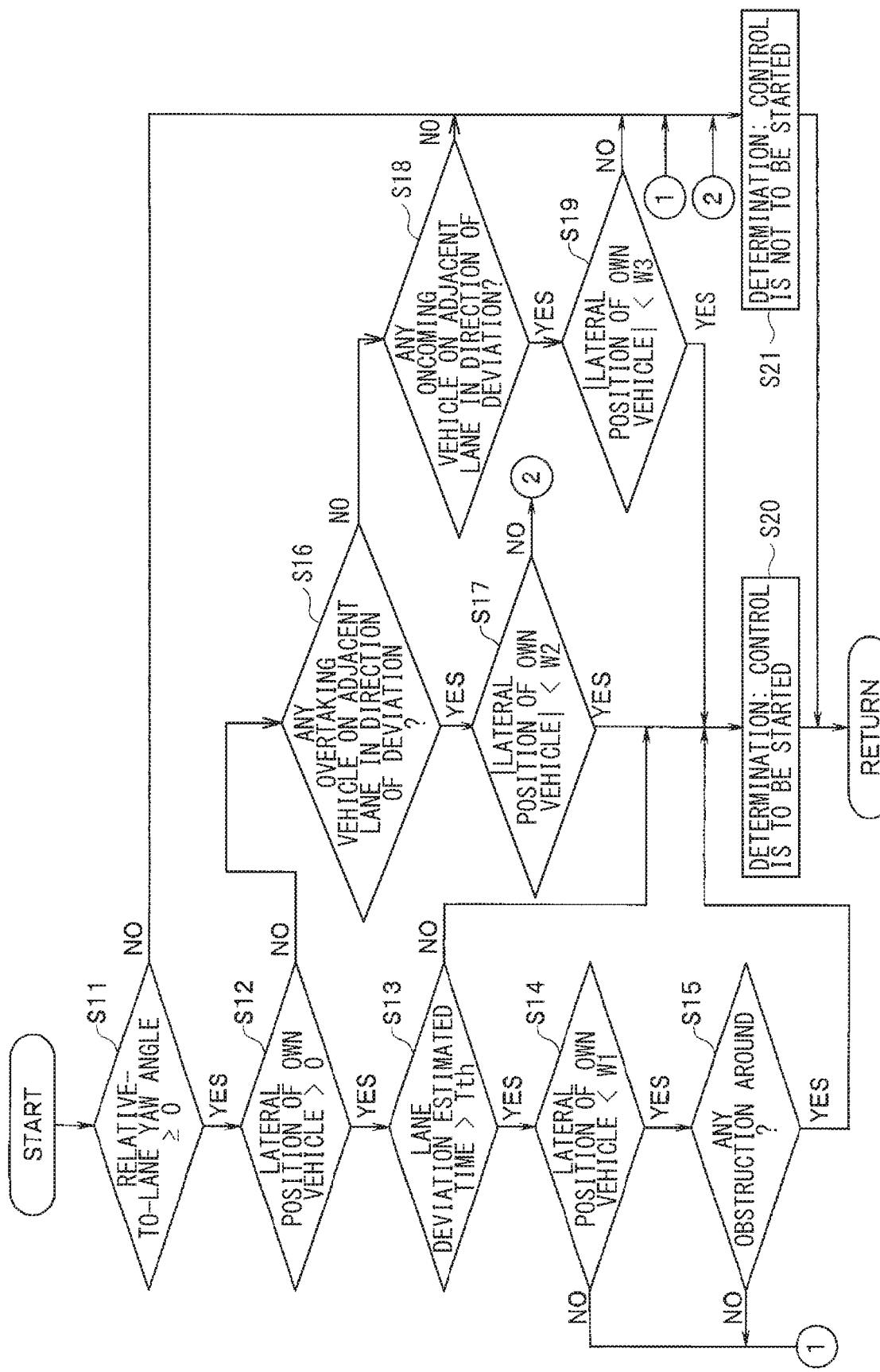
FIG. 6 is a flowchart illustrating an example of a routine of a determination as to whether to start the lane deviation prevention control.

Description now moves on to program processing related to the lane deviation prevention control as described above, with reference to flowcharts of FIGS. 5 and 6. The lane deviation prevention control is to be executed by the steering controller 50. The flowchart of FIG. 5 illustrates an example of a main routine of the lane deviation prevention control. The flowchart of FIG. 6 illustrates an example of a lane deviation prevention control start determination routine, in the main routine. The lane deviation prevention control start determination routine includes determining whether or not to start the lane deviation prevention control.

First, referring to FIG. 5, described is the main routine of the lane deviation prevention control. In the main routine, first, in step S1, the steering controller 50 may perform input processing. The input processing includes inputting, for example, sensor signals, recognition information, and control information. For example, the steering controller 50 may input signals from the sensors and undepicted switches, the recognition information by the camera and the rear-sideward radar from the exterior environment recognition device 150, and the control information from other controllers through the communication bus 200. Non-limiting examples of the sensors may include the steering angle sensor 21, the torque sensor 22, the rotation angle sensor 23, the vehicle speed sensor 24, and the yaw rate sensor 25.

Thereafter, the routine may proceed to step S2. In step S2, the lane deviation prevention control start determination routine of FIG. 6 may be executed to determine whether or not to start the lane deviation prevention control. In step S3, the target yaw rate γtgt may be calculated. In step S4, the target steering torque Tp may be calculated.

As mentioned above, in the case where the lane deviation prevention control is executed, the target yaw rate γtgt may be the addition of the lane curvature turn target yaw rate γtgt_lane in accordance with the lane curvature and the deviation prevention behavior generation target yaw rate γtgt_turn for prevention of the deviation from the lane. The target steering torque Tp may be the addition of the feedforward torque Tp_ff_lane and Tp_ff_turn, and the feedback torque Tp_fb. The feedforward torque Tp_ff lane and Tp_ff turn may be obtained by torque conversion of the lane curvature turn target yaw rate γtgt_lane and the deviation prevention behavior generation target yaw rate γtgt_turn. The feedback torque Tp_fb is to be fed back to the target yaw rate γtgt. However, in a case with detection of the driver's steering operation in the direction in which the deviation is suppressed, the feedback torque Tp_fb may be brought to zero (0).

Meanwhile, in the case where the lane deviation prevention control is not executed, the target yaw rate γtgt may become the lane curvature turn target yaw rate γtgt_lane in accordance with the lane curvature. The target steering torque Tp may be the addition of the feedforward torque Tp_ff lane and the feedback torque Tp_fb. The feedforward torque Tp_ff lane may be obtained by the torque conversion of the lane curvature turn target yaw rate γtgt_lane. The feedback torque Tp_fb is to be fed back to the target yaw rate γtgt.

After the calculation of the target steering torque Tp, the routine may proceed to step S5. In step S5, output processing may be performed. The output processing may include outputting the target steering torque Tp to the motor driver 20 that drives the EPS motor 12. By the output processing, the predetermined steering control through the EPS device 1 may be carried out.

Description is given next of the lane deviation prevention control start determination routine to be executed in step S2 of the forgoing main routine, with reference to the flowchart of FIG. 6.

In the lane deviation prevention control start determination routine, first, in step S11, a check may be made as to whether or not the current relative-to-lane yaw angle θyaw satisfies θyaw≥0. In other words, a check may be made as to whether or not the current traveling direction of the own vehicle is the direction of deviation. In a case where the traveling direction of the own vehicle is not the direction of deviation, the routine may proceed from step S11 to step S21. In step S21, a determination may be made that the lane deviation prevention control is not to be started. In a case where the traveling direction of the own vehicle is the direction of deviation, the routine may proceed from step S11 to step S12.

In step S12, a determination may be made, on the basis of the current lateral position x of the own vehicle, as to whether or not the own vehicle is inside the lane. In this implementation, in a case where the lateral position x of the own vehicle is larger than zero (x>0), a determination may be made that the own vehicle is inside the lane, and the routine may proceed to step S13. In a case where the lateral position x of the own vehicle is equal to or smaller than zero (x≤0), a determination may be made that the own vehicle is outside the lane, and the routine may proceed to step S16.

In the case where the own vehicle is inside the lane, in step S13, the lane deviation estimated time Ttlc may be calculated. The lane deviation estimated time Ttlc means the time it takes for the own vehicle to deviate from the lane. A check may be made as to whether or not the lane deviation estimated time Ttlc is larger than the threshold Tth decided on the basis of the vehicle speed V and the lane curvature κ. In a case where the lane deviation estimated time Ttlc is equal to or smaller than the threshold Tth (Ttlc≤Tth), the routine may proceed from step S13 to step S20. In step S20, a determination may be made that the lane deviation prevention control is to be started. In a case where the lane deviation estimated time Ttlc is larger than the threshold Tth (Ttlc>Tth), the routine may proceed from step S13 to step S14.

In step S14, a check may be made as to whether or not the lateral position x of the own vehicle is smaller than the control start threshold W1 decided on the basis of the lane width. In a case where the lateral position x of the own vehicle is equal to or larger than the control start threshold W1 (x≥W1), the routine may proceed from step S14 to step S21. In step S21, a determination may be made that the lane deviation prevention control is not to be started. In a case where the lateral position x of the own vehicle is smaller than the control start threshold W1 (x<W1), the routine may proceed from step S14 to step S15. In step S15, a check may be made as to presence or absence of any obstruction that may possibly come into contact with the own vehicle in the direction of deviation.

In a case with the absence of the obstruction that may possibly come into contact with the own vehicle in the direction of deviation, the routine may proceed from step S15 to step S21. In step S21, a determination may be made that the lane deviation prevention control is not to be started. In a case of the presence of the obstruction that may possibly come into contact with the own vehicle in the direction of deviation, the routine may proceed to step S15 to step S20. In step S20, a determination may be made that the lane deviation prevention control is to be started.

Thereafter, in step S12, in a case where the own vehicle is outside the lane (lateral position x≤0), i.e., in a case where the own vehicle is outside the lane because the driver's intentional operation has caused temporary cancellation of the lane deviation prevention control, the routine may proceed to step S16. Alternatively, in steps S15 and S21 as mentioned above, in a case where the determination has been made that the lane deviation prevention control is not to be started because of the absence of the obstruction in the direction of deviation, and where the driver's operation has caused the own vehicle to be outside the lane, the routine may also proceed to step S16. In step S16, a check may be made as to presence or absence of any overtaking vehicle on the adjacent lane on the deviation side.

In a case with the presence of the overtaking vehicle on the adjacent lane on the deviation side, the routine may proceed from step S16 to step S17. In step S17, a check may be made as to whether or not (an absolute value of) the lateral position of the own vehicle |x| is smaller than the control start threshold W2. In a case where the absolute value of the lateral position of the own vehicle |x| is smaller than the control start threshold W2 (|x|<W2), the routine may proceed to step S20. In step S20, a determination may be made that the lane deviation prevention control is to be started. In a case where the absolute value of the lateral position of the own vehicle |x| is equal to or larger than the control start threshold W2 (|x|≥W2), the routine may proceed to step S21. In step S21, a determination may be made that the lane deviation prevention control is not to be started.

In step S16, in a case with the absence of the overtaking vehicle on the adjacent lane on the deviation side, the routine may proceed from step S16 to step S18. In step S18, a check may be made as to presence or absence of any oncoming vehicle on the adjacent lane on the deviation side. In a case with the absence of the oncoming vehicle on the adjacent lane on the deviation side, the routine may proceed to step S21. In step S21, the determination may be made that the lane deviation prevention control is not to be started. In a case with the presence of the oncoming vehicle on the adjacent lane on the deviation side, the routine may proceed to step S19.

In step S19, a check may be made as to whether or not (the absolute value of) the lateral position of the own vehicle |x| is smaller than the control start threshold W3. In a case where the absolute value of the lateral position of the own vehicle |x| is smaller than the control start threshold W3 (|x|<W3), the routine may proceed to step S20. In step S20, the determination may be made that the lane deviation prevention control is to be started. In a case where the absolute value of the lateral position of the own vehicle |x| is equal to or larger than the control start threshold W3 (|x|≥W3), the routine may proceed to step S21. In step S21, the determination may be made that the lane deviation prevention control is not to be started. In this case, there may be set relation of W3>W2, allowing the lane deviation prevention control to be started in a wider range in the case with the presence of the oncoming vehicle on the adjacent lane on the deviation side, than in the case with the presence of the overtaking vehicle. This makes it easier for the lane deviation prevention control to be started even when the deviation is taking place.

Specifically, upon detection of the overtaking vehicle from behind while the own vehicle is deviating from its traveling lane toward the adjacent lane, there are cases where allowing the own vehicle to keep on making a lane change to the adjacent lane would be better, depending on the lateral position of the own vehicle. Starting the lane deviation prevention control in such cases would compel the own vehicle to return to the previously-traveled lane, at timing when the own vehicle would naturally be able to make the lane change smoothly. This behavior may give the driver the sense of incongruity. Meanwhile, upon detection of the oncoming vehicle from forward while the own vehicle is deviating from its traveling lane toward the adjacent lane, it is desirable to start the lane deviation prevention control whenever possible, to ensure safety. This is because there is possibility of collision with the oncoming vehicle.

Therefore, the control start threshold W3 for the oncoming vehicle may take a value that allows the lane deviation prevention control to be started in a wider range of the lateral position, than the control start threshold W2 for the overtaking vehicle (W3>W2). This makes it possible to provide a more enhanced level of safety. The control start threshold W3 may be set at, for example, a limit of the lateral position where the traveling lane of the own vehicle is detectable.

As described, in this implementation, in the execution of the lane deviation prevention control, the lane deviation prevention control is started even when the own vehicle has already deviated from the lane, on the condition that the overtaking vehicle or the oncoming vehicle is detected on the adjacent lane on the deviation side, and that the lateral position of the own vehicle is equal to or smaller than the control start threshold. The lane deviation prevention control includes preventing the own vehicle from deviating the lane. The overtaking vehicle means a vehicle that approaches from behind. The oncoming vehicle means a vehicle that approaches from forward.

Therefore, in the lane deviation prevention control of this implementation, it is possible to avoid the situation that once the own vehicle has deviated from the lane, there is no way of bringing the lane deviation prevention control to operation even in the case with the approaching vehicle on the adjacent lane on the deviation side. Hence, it is possible to provide an enhanced level of safety.

The steering controller 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering controller 50 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering controller 50 illustrated in FIG. 1.

Although the technology has been described in terms of exemplary implementations, it is not limited thereto. It should be appreciated that variations may be made in the described implementations by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A lane deviation prevention control device for vehicle, the lane deviation prevention control device comprising:
an exterior information detector configured to detect an approaching vehicle that is traveling on an adjacent lane and approaching an own vehicle, the adjacent lane being in adjacency to an own lane on which the own vehicle is traveling; and
a lane deviation prevention control start determiner configured to determine whether or not to start a lane deviation prevention control, on a basis of a relative-to-lane yaw angle of the own vehicle relative to the own lane, and on a basis of a lateral position of the own vehicle relative to the own lane, the lane deviation prevention control including preventing the own vehicle from deviating from the own lane,
the lane deviation prevention control start determiner being configured to determine to start the lane deviation prevention control even when the own vehicle has already deviated from the own lane, on a condition that the exterior information detector detects the approaching vehicle on the adjacent lane on deviation side on which deviation is taking place, and that the lateral position of the own vehicle is equal to or smaller than a control start threshold.

2. The lane deviation prevention control device for vehicle according to claim 1, wherein the lane deviation prevention control start determiner makes distinction between a case where the approaching vehicle is an oncoming vehicle that approaches from forward of the own vehicle, and a case where the approaching vehicle is an overtaking vehicle that approaches from behind the own vehicle, to vary the control start threshold in accordance with the distinction.

3. The lane deviation prevention control device for vehicle according to claim 1, wherein the lane deviation prevention control start determiner sets the control start threshold for the overtaking vehicle, on a basis of a vehicle speed of the own vehicle, and on a basis of a speed of movement of the own vehicle in the direction of deviation.

4. The lane deviation prevention control device for vehicle according to claim 2, wherein the lane deviation prevention control start determiner sets the control start threshold for the overtaking vehicle, on a basis of a vehicle speed of the own vehicle, and on a basis of a speed of movement of the own vehicle in the direction of deviation.

5. The lane deviation prevention control device for vehicle according to claim 2, wherein the lane deviation prevention control start determiner allows the control start threshold to take a value that allows the lane deviation prevention control to be started in a wider range in the case of the oncoming vehicle than in the case of the overtaking vehicle.

6. The lane deviation prevention control device for vehicle according to claim 1, wherein the external environment detector calculates the relative-to-lane yaw angle.

7. The lane deviation prevention control device for vehicle according to claim 2, wherein the external environment detector calculates the relative-to-lane yaw angle.

8. The lane deviation prevention control device for vehicle according to claim 3, wherein the external environment detector calculates the relative-to-lane yaw angle.

9. The lane deviation prevention control device for vehicle according to claim 4, wherein the external environment detector calculates the relative-to-lane yaw angle.

10. The lane deviation prevention control device for vehicle according to claim 1, wherein the lane deviation prevention control start determiner sets, as the lateral position of the own vehicle, a distance from a side part of a vehicle body of the own vehicle on the deviation side to a lane line on the deviation side.

11. The lane deviation prevention control device for vehicle according to claim 2, wherein the lane deviation prevention control start determiner sets, as the lateral position of the own vehicle, a distance from a side part of a vehicle body of the own vehicle on the deviation side to a lane line on the deviation side.

12. The lane deviation prevention control device for vehicle according to claim 3, wherein the lane deviation prevention control start determiner sets, as the lateral position of the own vehicle, a distance from a side part of a vehicle body of the own vehicle on the deviation side to a lane line on the deviation side.

13. The lane deviation prevention control device for vehicle according to claim 4, wherein the lane deviation prevention control start determiner sets, as the lateral position of the own vehicle, a distance from a side part of a vehicle body of the own vehicle on the deviation side to a lane line on the deviation side.

14. The lane deviation prevention control device for vehicle according to claim 1, wherein the exterior information detector detects, as exterior information regarding the own vehicle, lane information regarding the own lane and lane information regarding the adjacent lane, the exterior information including presence of the approaching vehicle.

15. The lane deviation prevention control device for vehicle according to claim 2, wherein the exterior information detector detects, as exterior information regarding the own vehicle, lane information regarding the own lane and lane information regarding the adjacent lane, the exterior information including presence of the approaching vehicle.

16. The lane deviation prevention control device for vehicle according to claim 3, wherein the exterior information detector detects, as exterior information regarding the own vehicle, lane information regarding the own lane and lane information regarding the adjacent lane, the exterior information including presence of the approaching vehicle.

17. The lane deviation prevention control device for vehicle according to claim 4, wherein the exterior information detector detects, as exterior information regarding the own vehicle, lane information regarding the own lane and lane information regarding the adjacent lane, the exterior information including presence of the approaching vehicle.

18. A lane deviation prevention control device for vehicle, the lane deviation prevention control device comprising:
an exterior information detector configured to detect an approaching vehicle that is traveling on an adjacent lane and approaching an own vehicle, the adjacent lane being in adjacency to an own lane on which the own vehicle is traveling; and
circuitry configured to determine whether or not to start a lane deviation prevention control, on a basis of a relative-to-lane yaw angle of the own vehicle relative to the own lane, and on a basis of a lateral position of the own vehicle relative to the own lane, the lane deviation prevention control including preventing the own vehicle from deviating from the own lane,
the circuitry being configured to determine to start the lane deviation prevention control even when the own vehicle has already deviated from the own lane, on a condition that the exterior information detector detects the approaching vehicle on the adjacent lane on deviation side on which deviation is taking place, and that the lateral position of the own vehicle is equal to or smaller than a control start threshold.

* * * * *